United States Patent [19]
Doremus et al.

[11] Patent Number: 5,815,565
[45] Date of Patent: Sep. 29, 1998

[54] SERVICE EVALUATION SYSTEM AND METHOD FOR A TELEPHONIC SWITCH

[75] Inventors: Lonnie Doremus, Schaumburg; Wayne L. Harbuziuk, Wheaton; David L. Blaha, Aurora, all of Ill.

[73] Assignee: Rockwell International Corporation, Costa Mesa, Calif.

[21] Appl. No.: 535,431

[22] Filed: Sep. 28, 1995

[51] Int. Cl.⁶ .................................................. H04M 3/22
[52] U.S. Cl. .................... 379/265; 379/112; 379/211; 379/309
[58] Field of Search .................. 379/34, 112, 201, 379/265, 266, 309, 210, 211, 212

[56] References Cited

U.S. PATENT DOCUMENTS

| | | | |
|---|---|---|---|
| 5,335,269 | 8/1994 | Steinlicht | 379/265 |
| 5,463,681 | 10/1995 | Vaios et al. | 379/34 |
| 5,467,391 | 11/1995 | Donaghue, Jr. et al. | 379/265 |
| 5,471,519 | 11/1995 | Howe et al. | 379/34 |
| 5,535,256 | 7/1996 | Maloney et al. | 379/34 |
| 5,535,261 | 7/1996 | Brown et al. | 379/112 |

*Primary Examiner*—Krista Zele
*Assistant Examiner*—Scott Wolinsky
*Attorney, Agent, or Firm*—Welsh & Katz, Ltd.

[57] ABSTRACT

A service evaluator system and method for evaluating, based on DNIS numbers, incoming telephone calls routed through a telephonic switch, such as an automatic call distributor (ACD) 100 is provided. Supervisory personnel select one or more dialed number identification service (DNIS) numbers for evaluation via a supervisory terminal 108. A DNIS evaluator circuit 120 of the ACD 100 stores the selected DNIS numbers. When a DNIS incoming telephone call is received by the ACD 100, the DNIS evaluator circuit 120 collects the DNIS number transmitted with the call. The DNIS evaluator circuit 120 determines whether any of the selected DNIS numbers match the collected DNIS number. If one of the selected DNIS numbers matches the collected DNIS number, the supervisor is connected to the call, preferably in a nonintrusive manner.

14 Claims, 2 Drawing Sheets

SERVICE EVALUATION SYSTEM AND METHOD FOR A TELEPHONIC SWITCH

BACKGROUND OF THE INVENTION

The present invention relates generally to telephonic switches and, more particularly, to a service evaluation system and method for evaluating service in an automatic call distributor wherein incoming telephone calls which are to be evaluated by a supervisor, or other managerial personnel, are selected based on dialed number identification service (DNIS) numbers arriving with the incoming telephone calls.

Automatic call distribution (ACD) systems are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug, 18, 1992, entitled "Pulse Width Modulated Self-Clocking and Self-Synchronizing Data Transmission and Method for a Telephonic Communication Network Switching System", the disclosure of which is hereby incorporated by reference.

Supervisors frequently need to listen in on incoming telephone calls to assure that agents are working within the organization's performance standards. For example, the supervisor can verify that an agent is answering a caller's questions properly, responding in a courteous and friendly manner and using call time efficiently. Prior systems unfortunately do not permit a supervisor to evaluate calls based on DNIS number. As is well known, the DNIS number is representative of the telephone number the caller dialed. The telephone number the caller dialed may indicate that the call is about a particular product or is for a particular reason, such as a complaint or the like. Supervisors frequently need to evaluate calls directed to a particular product or placed for a particular reason.

Accordingly, there is a need in the art for a service evaluator system and method for evaluating incoming telephone calls based on DNIS numbers.

SUMMARY OF THE INVENTION

This need is met by a service evaluator system and method in accordance with the present invention wherein service evaluations of incoming telephone calls are substantially automatically performed based on a collected DNIS number associated with each incoming telephone call and a selected DNIS number which may be selected by a supervisor. Thus, a supervisor can substantially automatically evaluate incoming telephone calls associated with a particular DNIS number.

In accordance with one aspect of the present invention, a service evaluator system for evaluating incoming telephone calls routed by a telephonic switch to agents is provided. The systems comprises a dialed number identification service collector circuit for collecting dialed number identification service digits received with the incoming telephone calls. A digit selection circuit selects dialed number identification service digits corresponding to incoming telephone calls desired to be evaluated. The supervisor, or other personnel, are connected to incoming telephone calls by a connection circuit based on the collected dialed number identification service digits and the selected dialed number identification service digits.

A trunk group service evaluator circuit may be provided for selecting at least one trunk information group connected to the telephonic switch and for connecting to incoming telephone calls received over the selected at least one trunk information group. Additionally, the service evaluator system may comprise an agent group service evaluator circuit for selecting at least one agent information group and for connecting to incoming telephone calls routed to the selected at least one agent information group.

In accordance with another aspect of the present invention, a method for evaluating incoming telephone calls routed by a telephonic switch to agents is provided. The method comprising the steps of: selecting at least one dialed number identification service number which correspond to incoming telephone calls to be evaluated; collecting a dialed number identification service number associated with each of the incoming telephone calls; and connecting to at least one of the incoming telephone calls for evaluation based on the selected at least one dialed number identification service number and the collected dialed number identification service number.

It is thus a feature of the present invention to provide a service evaluation system which substantially automatically evaluates incoming telephone calls based on DNIS number.

These and other features and advantages of the present invention will become apparent from the following detailed description, the accompanying drawings and the appended claims.

DETAILED DESCRIPTION OF THE INVENTION

Figure 1:
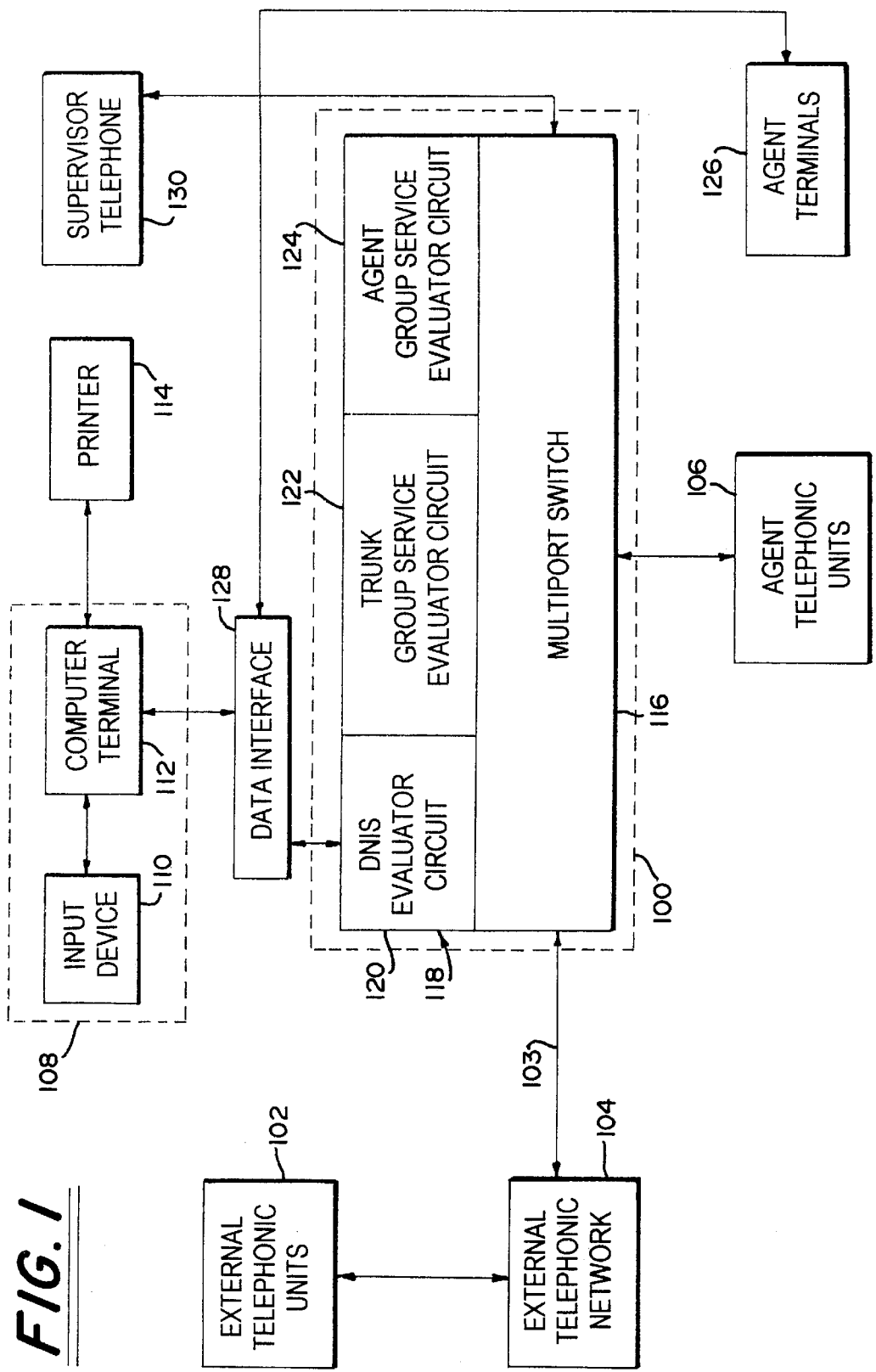
FIG. 1 is a schematic block diagram of a telephonic system including an automatic call distributor employing a service evaluator system having a DNIS evaluator circuit in accordance with the present invention.

A service evaluator system and method in accordance with the present invention for evaluating incoming telephone calls routed by a telephonic switch, such as an automatic call distributor (ACD) 100, to agents is shown in FIG. 1. The ACD 100 routes incoming telephone calls received from external telephonic units 102 via a telephonic line 103 and an external telephonic network 104 to a plurality of agent telephonic units 106. As will be readily apparent to those skilled in the art, the telephonic switch may be any of a number of different call switching systems, or devices. Although a service evaluator system and method in accordance with the present invention may be implemented in any of a number of automatic call distributors, they are preferably implemented in an automatic call distributor of the type shown in U.S. Pat. No. 5,400,327, entitled "Automatic Call Distributor With Wireless Connection With Remote Unit and Method", issued on Mar. 21, 1995 to Dezonno, and U.S. Pat. No. 5,140,611, entitled "Pulse Width Modulated Self-Clocking and Self-Synchronizing Data Transmission and Method for a Telephonic Communication Network Switching System", issued on Aug. 18, 1992 to Jones et al., the disclosures of which are hereby incorporated by reference.

The ACD 100 is connected to a supervisor terminal 108, which preferably includes an input device 110, such as a keyboard, for entering information and a computer terminal 112 for displaying information relating to the operation of the ACD 100. The supervisor terminal 108 is preferably connected to a printer 114 for generating printed records of information relating to the operation of the ACD 100. The ACD 100 has a multiport switch 116 for routing incoming telephone calls to selected ones of the agent telephonic units 106. The multiport switch 116 is controlled by a central processing unit (CPU) and associated memory, generally designated by reference numeral 118. The CPU 118 is shown comprising a dialed number identification service (DNIS) evaluator circuit 120, a trunk information group service evaluator circuit 122 and an agent group service evaluator circuit 124 which are discussed more fully below. The CPU 118 is appropriately programmed to route incoming telephone calls through the ACD 100.

Figure 3:
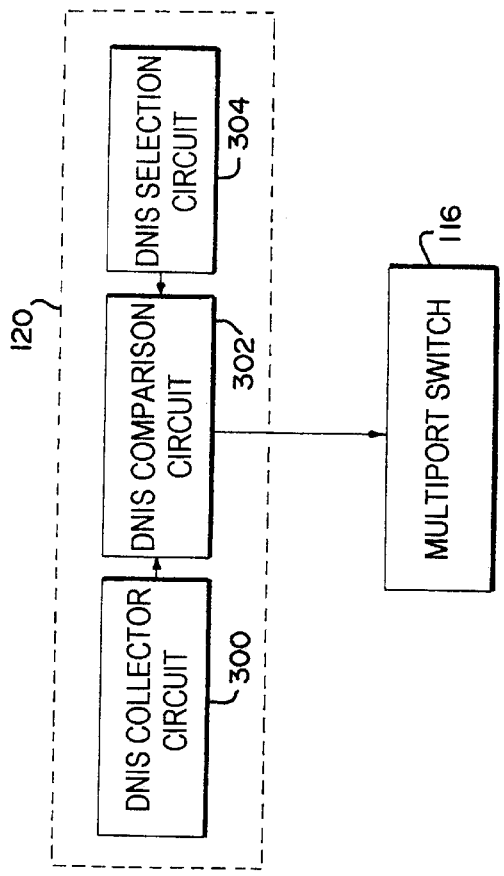
FIG. 3 is a schematic block diagram of the DNIS evaluator circuit shown in FIG. 1.

As shown in FIG. 3, the DNIS evaluator circuit 120 is comprised generally of a DNIS collector circuit 300, a DNIS comparison circuit 302 and a DNIS selection circuit 304. The operation of each of these circuits 300, 302 and 304 will now be described. A supervisor selects a DNIS number associated with incoming telephone calls to be evaluated via the supervisor telephone 130. Those skilled in the art will readily comprehend that the DNIS number may be selected through the supervisor terminal 108. In addition, it is contemplated that more than one DNIS number be selected by the supervisor. The selected DNIS numbers are received and stored by the DNIS selection circuit 304. The DNIS collector circuit 120 collects DNIS numbers transmitted with incoming telephone calls.

The DNIS comparison circuit 302 then compares the collected DNIS numbers for currently active incoming telephone calls to the one or more selected DNIS numbers to determine if any of the active calls are associated with a DNIS number matching one or more of the selected DNIS numbers. If a call is detected which is associated with one or more of the selected DNIS numbers, then the DNIS comparison circuit 302 instructs the multiport switch 116 to connect the supervisor to the matching call. Preferably, the supervisor is connected in a nonintrusive manner. If no matching DNIS numbers are detected, the DNIS evaluator circuit 120 awaits further incoming telephone calls. If more than one of the active calls has a DNIS number which matches one or more of the selected DNIS numbers, the supervisor may select one of the matched calls or scroll through the matched calls via the supervisor terminal 108.

A supervisor may, on the other hand, wish to evaluate incoming calls based on the trunk information group over which the calls are received. The conventional trunk information group service evaluator circuit 122 permits a supervisor to select a trunk information group for evaluating calls. Calls received over the selected trunk information group are then evaluated. A supervisor may alternatively, or in addition to, wish to evaluate calls routed to a particular agent information group. The supervisor selects one or more agent information groups which is stored in the conventional agent group service evaluator circuit 124. When a call is received, the agent group service evaluator circuit 124 detects which agent information group the call is routed to and, if the call is routed to one of the selected agent information groups, the supervisor is connected. Since trunk group service evaluators and the agent group service evaluators are known in the art and are not important to the present invention beyond connecting a supervisor to incoming calls based on trunk or agent group, further details of these systems will not be further disclosed herein.

Agent terminals 126, which may include conventional display units, display information relating to the operation of the ACD 100 to the agents receiving the incoming telephone calls. A data interface 128 provides data communications between the CPU 118, the supervisor terminal 108 and the agent terminals 126. As will be readily apparent, the structure and philosophy of the above components of the ACD 100 are well known in the art and will not be further discussed herein. Further, other configurations of the ACD 100 can be advantageously employed in the present invention. For example, the agent terminals 126 may be an integral part of the agent telephonic units 106, such as digital displays on a telephone or telephonic console. A supervisor telephone 130 is connected to the multiport switch 116. The multiport switch 116, under the control of the CPU 118, connects the supervisor telephone 130 to selected incoming telephone calls so that a supervisor can evaluate whether an agent is working within the organization's performance standards. For example, the supervisor can verify that an agent is answering a caller's questions properly, responding in a courteous and friendly manner and using call time efficiently. Preferably, the multiport switch 116 connects the supervisor to the incoming call in a nonintrusive manner so that neither the caller nor the agent knows the supervisor is evaluating the call.

Figure 2:
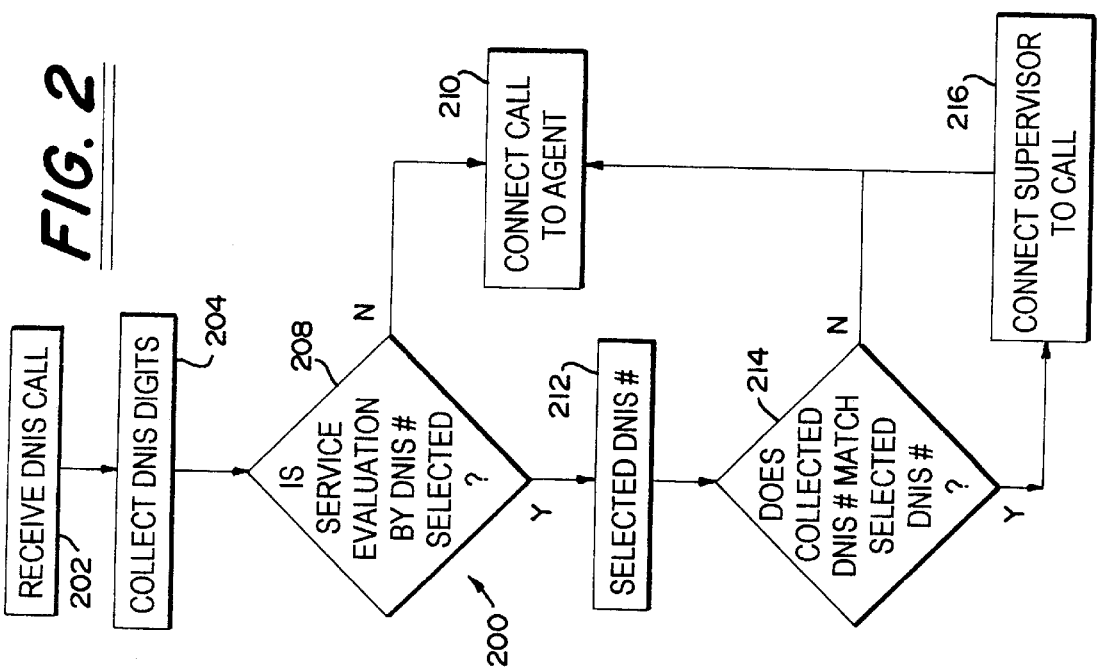
FIG. 2 is a flow chart illustrating an exemplary method for operating the service evaluator system in the ACD as shown in FIG. 1.

An exemplary method in accordance with the present invention is shown in a flow chart 200 in FIG. 2. An incoming telephone call including a DNIS number is received by the ACD 100 in step 202. The DNIS number, comprised of DNIS digits, is collected by the DNIS evaluator circuit 120 of the CPU 118, at step 204. These digits are then temporarily stored for further processing in the CPU 118.

It is next determined, at step 208, whether service evaluation by DNIS number has been selected by the supervisor, or other personnel. If the supervisor has not selected service evaluation by DNIS number, the incoming telephone call is connected to the agent at step 210. If the supervisor has selected service evaluation by DNIS number, the supervisor then selects one or more DNIS numbers for evaluation at step 212. It is next determined whether the collected DNIS number associated with the incoming telephone call matches any of the one or more selected DNIS numbers at step 214.

If the collected DNIS number does not match any of the selected DNIS numbers, the call is connected to the agent at step 210. If the collected and selected DNIS numbers match, the supervisor is connected to the call at step 216 and the agent is connected to the call at step 210.

Having thus described the invention in detail by way of reference to preferred embodiments thereof, it will be apparent that other modifications and variations are possible without departing from the scope of the invention defined in the appended claims. For example, the ACD 100 may have design configurations which depart from those described herein. Therefore, the spirit and scope of the appended claims should not be limited to the description of the preferred versions contained herein.

What is claimed is:

1. A service evaluator system for evaluating incoming telephone calls received by an automatic call distributor from an external public switched telephone network and routed by a telephonic switch of the automatic call distributor to agents, the system comprising:

a dialed number identification service collector circuit for collecting dialed number identification service digits received with the incoming telephone calls from the external public switched telephone network;

a digit selection circuit for selecting dialed number identification service digits corresponding to incoming telephone calls desired to be evaluated by a service evaluator; and a connection circuit operably coupled to the dialed number identification service collector circuit and digit selection circuit which connects a service evaluator to incoming telephone calls based on the collected dialed number identification service digits and the selected dialed number identification service digits.

2. The service evaluator system as recited in claim 1 wherein the telephonic switch further comprises a comparison circuit operably coupled to the dialed number identification service collector circuit and digit selection circuit which compares the collected dialed number identification service digits and the selected dialed number identification service digits, and wherein an output of the comparison circuit is coupled to the connection circuit which connects the service evaluator to any of the incoming telephone calls which are associated with collected dialed number identification service digits matching the selected dialed number identification service digits.

3. The service evaluator system as recited in claim 1 wherein the dialed number identification service collector circuit collects four dialed number identification service digits for each of the incoming telephone calls.

4. The service evaluator system as recited in claim 1 wherein the connection circuit connects the service evaluator to the incoming telephone calls in a nonintrusive manner.

5. The service evaluator system as recited in claim 1 further comprising a trunk group service evaluator circuit for selecting at least one trunk information group connected to the telephonic switch and for connecting the service evaluator to incoming telephone calls received over the at least one selected trunk information group.

6. The service evaluator system as recited in claim 1 further comprising an agent group service evaluator circuit for selecting at least one agent information group and for connecting the service evaluator to incoming telephone calls routed to the at least one selected agent information group.

7. A method for evaluating incoming telephone calls received by an automatic call distributor from an external public switched telephone network and routed by a telephonic switch of the automatic call distributor to agents comprising the steps of:

selecting at least one dialed number identification service number which corresponds to incoming telephone calls to be evaluated;

collecting a dialed number identification service number for each of the incoming telephone calls from the external public switched telephone network; and connecting an evaluator to at least one of the incoming telephone calls based on the at least one selected dialed number identification service number and the collected dialed number identification service number.

8. The method as recited in claim 7 wherein the step of selecting at least one dialed number identification service number comprises the step of selecting at least one dialed number identification service number consisting of four digits.

9. The method as recited in claim 7 wherein the step of connecting comprises the steps of:

comparing the at least one selected dialed number identification service number and the collected dialed number identification service number for each incoming telephone call; and connecting the evaluator to each incoming telephone call associated with a collected dialed number identification service number matching at least one selected dialed number identification service number.

10. The method as recited in claim 9 wherein the step of connecting further comprises the step of:

connecting the evaluator in a nonintrusive manner to each incoming telephone call associated with a collected dialed number identification service number matching at least one selected dialed number identification service number.

11. A service evaluator system for evaluating incoming telephone calls received by an automatic call distributor from an external public switched telephone network and routed by a telephonic switch of the automatic call distributor to agents, the system comprising:

a dialed number identification service evaluator circuit for collecting dialed number identification service digits received with the incoming telephone calls from the external public switched telephone network, for selecting dialed number identification service digits corresponding to incoming telephone calls desired to be evaluated, and for connecting an evaluator to incoming telephone calls based on the collected dialed number identification service digits and the selected dialed number identification service digits;

a trunk group service evaluator circuit for selecting at least one trunk information group connected to the telephonic switch and for connecting the evaluator to incoming telephone calls received over the at least one selected trunk information group; and an agent group service evaluator circuit for selecting at least one agent information group and for connecting the evaluator to incoming telephone calls routed to the at least one selected agent information group.

12. The service evaluator system as recited in claim 11 wherein the dialed number identification service evaluator circuit comprises a comparison circuit for comparing the collected dialed number identification service digits and the selected dialed number identification service digits, and wherein the dialed number identification service evaluator circuit connects the evaluator to any of the incoming telephone calls which are associated with collected dialed number identification service digits matching the selected dialed number identification service digits.

13. The service evaluator system as recited in claim 12 wherein the dialed number identification service evaluator circuit collects four dialed number identification service digits for each of the incoming telephone calls.

14. The service evaluator system as recited in claim 11 wherein the evaluator is connected to the incoming telephone calls in a nonintrusive manner.

* * * * *